United States Patent Office 3,051,598
Patented Aug. 28, 1962

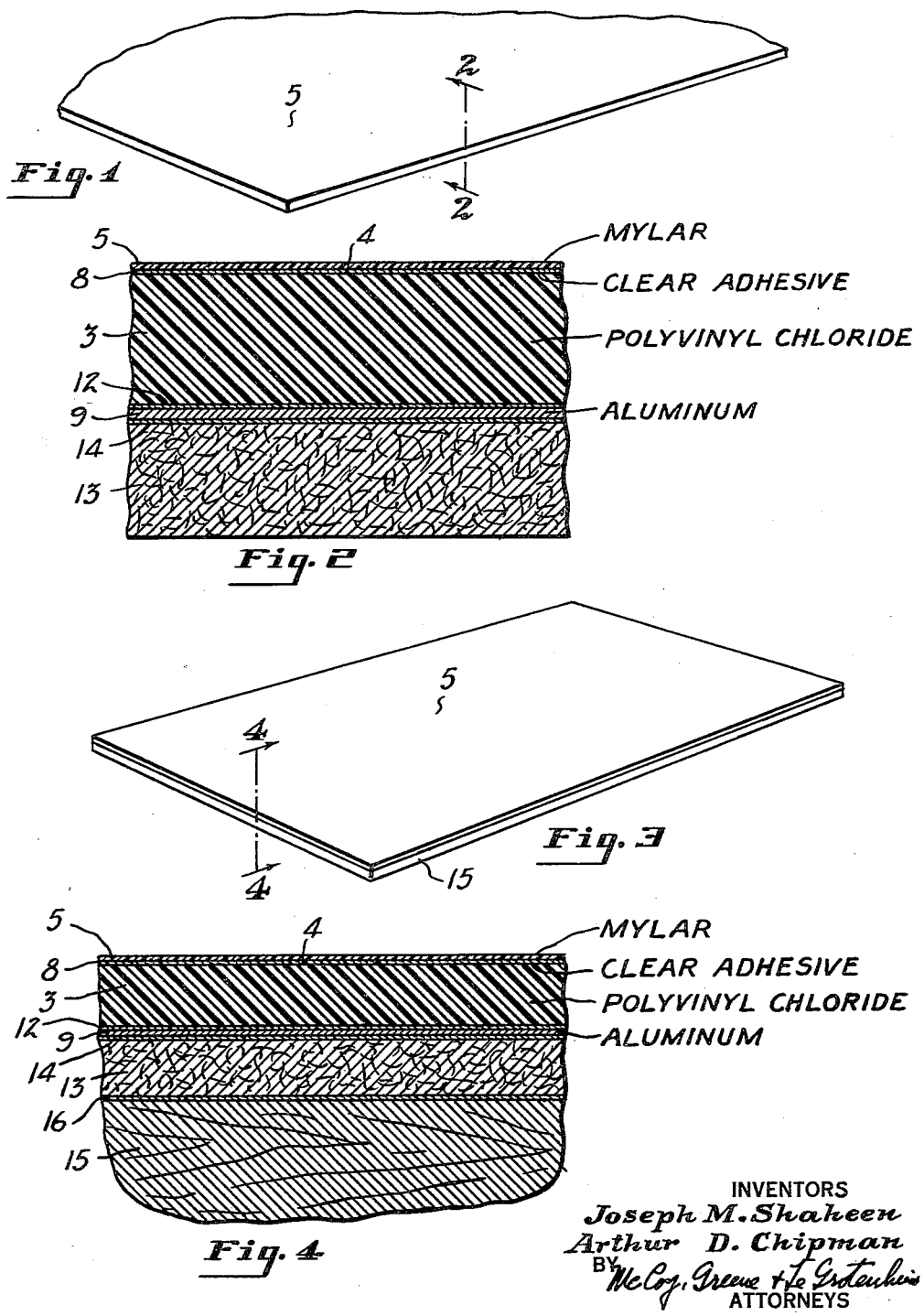

3,051,598
HEAT RESISTANT LAMINATED COUNTER TOP
Arthur D. Chipman, Reading, Mass., and Joseph M. Shaheen, Whittier, Calif., assignors to The General Tire & Rubber Company, Akron, Ohio, a corporation of Ohio
Filed Mar. 25, 1958, Ser. No. 723,717
1 Claim. (Cl. 154—43)

The present invention relates to heat-resistant laminated articles and, more particularly, to a laminated plastic sheeting suitable for covering table tops, counter tops or the like.

According to the present invention, a plastic (synthetic resin) such as polyvinyl chloride is printed with a design and top coated with a transparent layer of Mylar (polyethylene terephthalate) which is bonded thereto by means of a clear transparent cement that remains transparent even though subjected to heat and light. Thus, the printed surface of the polyvinyl chloride will show through and provide an attractive, but inexpensive covering for table tops or the like.

While such a material is stain resistant and attractive, a serious drawback to its use is that burning cigarettes and other sources of intense heat tend to destroy and mar its surface. According to the present invention, in order to minimize the influence of great heat such as burning cigarettes, means are provided to carry away the heat developed on the plastic surface.

According to the present invention a thin layer of a heat conducting metal, such as aluminum, is laminated to the non-printed side of the polyvinyl chloride layer so as to conduct heat away from the Mylar film to prevent scorching and disfiguration of the outer surface thereof.

The objects of the present invention are to provide an attractive durable stain-resistant plastic sheet which can be economically manufactured and to provide a laminated sheet which is not readily damaged by heat, cigarettes or the like.

Other objects, uses and advantages of the invention will be apparent from the following description and claims and from the drawing in which:

FIGURE 1 is a fragmentary perspective view of a laminated plastic sheeting made in accordance with the present invention;

FIGURE 2 is a fragmentary sectional elevational view of the sheeting of FIG. 1 taken along the line indicated at 2—2 in FIG. 1 and on an enlarged scale;

FIGURE 3 is a perspective view showing a wooden base covered with the plastic sheeting of FIG. 1; and FIGURE 4 is a fragmentary sectional view taken along the line indicated at 4—4 of FIG. 3 on an enlarged scale.

Referring more particularly to the drawings, in which like parts are identified by the same numerals throughout the several views, FIGS. 1 and 2 show a laminated plastic sheet according to the present invention. The sheet includes a relatively thick plastic layer 3 which is preferably a composition whose major portion consists of a polymer containing recurring units of the general formula

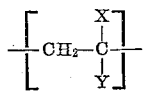

wherein X and Y are selected from the group consisting of hydrogen and halogen (including fluorine, chlorine, bromine and iodine) and preferably from the group consisting of hydrogen and chlorine. At least one of X and Y is a halogen atom in the preferred formula.

Suitable plastic materials are copolymers of vinyl halides such as vinyl chloride with vinyl acetate, polymers and copolymers of vinyl chloride, vinyl fluoride, vinylidene chloride, vinyl bromide and the like.

The plastic layer is preferably polyvinyl halide plasticized slightly with a non migratory plasticizer such as a polyethylene or propyleneglycol sebacate or adipate or other viscous polyester of a polyhydric alcohol and a polybasic acid, such as epoxidized soybean oil. The layer is also suitably plasticized with a blend of a polymeric plasticizer and high molecular weight phthalate.

Rubbery plasticizers such as rubbery polyurtehanes, copolymers of diolefines with acrylonitrile or methylisopropenyl ketone are also satisfactory. The weight of plasticizer is usually less than the weight of the polyvinylchloride resin and is preferably about ⅓ to ½ of the weight of the polyvinylchloride.

The polyvinyl layer may include other plasticizers, such as tricresyl phosphate, dioctyl adipate or the like; stabilizers, such as phenyl-beta-naphthylamine, tin laurate, fused lead stearate, cadmium-barium laurate, basic lead carbonate, or Paraplex G–62 (an epoxy-type stabilizer); and other conventional compounding ingredients such as calcium carbonate, titanium dioxide, etc.

As shown in the drawings the layer 3 is made of polyvinyl chloride layer and has a top surface 4 upon which is printed a design from colored inks so as to impart an attractive appearance to the layer. The layer 3 has a rather uniform thickness and is rather thick so as to have strength.

A hard top coating 5 of substantially uniform thickness is provided over the printed surface which is transparent so that the printed design can show through. The coating 5 should be rather thin for flexibility and should be substantially uniform in thickness throughout its length. The coating 5 should also be abrasion resistant, relatively insensitive to moisture, and resistant to solvent and chemical attack. I have found that a layer of Mylar is outstanding. Mylar is a balanced biaxially oriented heat-set polyethylene terephthalate as described in U.S. Patent No. 2,808,347. This material is a polyester with a very high molecular weight (above 10,000) formed from the reaction of about equal moles of ethylene glycol and terephthalic acid. The Mylar layer is biaxially oriented by stretching a film of the polyester in two substantially perpendicular directions to provide a characteristic crystal X-ray diffraction pattern.

An adhesive film 8 is provided to bond the Mylar layer 5 to the thick plastic layer 3. The adhesive film 8 is one that is preferably transparent and remains transparent even though subjected to heat from hot beverage containers or burning cigarettes. Where a printed design is used on the surface 4 of the plastic layer, an improved adhesive is provided which is clear and transparent and does not detract from the appearance of the surface. The improved adhesive composition is an epoxy-type resin cement in which the resinous material comprises about 15 to 35 percent by weight of a condensation product of an aliphatic organic compound having an ethylene oxide group on at least one of its chain ends such as 1-chloro-2,3-epoxypropane and an organic compound having at least two hydroxy groups such as 2,2-p-hydroxyphenyl-propane, glycerol or ethylene glycol. The epoxy compound should be used with other resinous materials hereafter described in order to be compatible with and adhere to the Mylar layer 5 and the vinyl plastic layer 3. In order to obtain a satisfactory bond with the Mylar layer, a resinous material such as a polyethylene sulfide or preferably a polyamide such as hexamethylene diamine adipate should be used so that the weight of the epoxy compound and the polyamide comprise about 40 to 60 percent of the total resinous component. The balance of the resinous component, or 40 to 60% by weight, should be a copolymer of vinyl chloride with vinyl acetate in order to obtain a good adhesive bond with the vinyl plastic layer 3. Stabilizers are desirable for strengthening the heat and light properties of the adhesive compositions.

Table I which follows shows a suitable adhesive composition for the clear adhesive:

TABLE I

| Ingredient | Parts by Weight |
| --- | --- |
| Reaction product of adipic acid and hexamethylene diamine ("Polyamide 100") | 15 |
| Condensation product of epichlorohydrin and Bisphenol A ("Epon 1000")[1] | 14 |
| Copolymer of 87% polyvinyl chloride and 13% polyvinyl acetate (VAGH) | 27 |
| Toluene | 16 |
| Isopropanol | 12 |
| Methyl ethyl ketone | 91 |
| Vinyl Stabilizer: ("Advastab Om-10," an organo tin stabilizer) | ½ |
| Vinyl Stabilizer ("Advastab S-52"—a polymeric tin stabilizer)[2] | ½ |

[1] Bisphenol A is 2,2-p-hydroxyphenylpropane.
[2] The stabilizer may also be tin laurate or cadmium-barium laurate.

Where the top coating 5 is Mylar and the plastic layer 3 is polyvinyl chloride, the adhesive compositions as indicated in Table I provides an excellent bond between the layers.

The plastic layer 3 may be coated with the clear adhesive composition of Table I by brushing, spraying or preferably by continuous means such as reverse roller coating or spreading with a doctor knife. After the plastic layer 3 is coated, the layer and adhesive composition is generally heated to drive off the solvent and to prepare for the bonding action of the thermosetting resins of the adhesive composition by applying the Mylar layer 5 to the plastic layer 3 while the adhesive composition is preferably still hot.

In order to prevent burning or scorching of the polyester layer 5, and the polyvinyl halide layer 3 the layer 3 is preferably bonded to a heat-conducting metal such as aluminum, alloys of aluminum, copper, alloys of copper such as copper and zinc, gold, silver or other metals or alloys having a thermal conductivity at least as high as that of aluminum. Aluminum is usually preferred because of its low cost.

As herein shown, the polyvinyl halide layer 3 is bonded by means of an adhesive film 12 to a layer 9 of aluminum foil. Any suitable adhesive may be used, such as a polyvinyl chloride-polyvinyl acetate copolymer resin (which is dissolved or tackified with an organic solvent) or a polyvinyl butyral resin (which may contain a small amount of plasticizer).

Good results may be obtained where the film 12 is a polyvinyl butyral tripolymer resin wherein about 19% by weight of the resin consists of vinyl alcohol

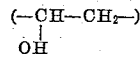

groups, about 0.3% by weight of the resin consists of vinyl acetate

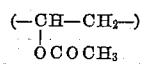

groups, and the remainder consists of vinyl butyral

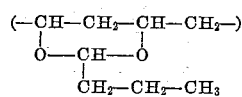

groups. Best results are obtained where the film 12 comprises 100 parts of a polyvinyl chloride-acetate tripolymer of 86% vinyl chloride, 13% vinyl acetate and 1% dibasic acid (such as maleic acid) and 15 to 35 parts of conventional plasticizers such as dioctyl phthalate and tricresyl phosphate.

The adhering of the aluminum layer to the polyvinyl halide layer may be obtained in a manner similar to the adhering of the Mylar layer to the polyvinyl halide layer. The bonding is accomplished by any suitable method such as coating the non-printed side of the polyvinyl chloride layer with the adhesive with a brush, a doctor knife, or by means of a reverse roller. Thereafter the polyvinyl chloride layer and adhesive are heated and the polyvinyl chloride and metal layers are calendered together.

The heat conductivity of the plastic layer 3, the polyester layer 5 and the cement films should be high enough so that the heat from a burning cigarette or the like will readily pass through to the aluminum layer. Since the layer 3 is usually relatively thick as compared to the other layers, its heat-conductivity is important. The heat conductivity of the plastic layer 3 is preferably not substantially less than that of polyvinyl chloride and should generally have a heat conductivity ($\lambda$) of about at least 3.5 to $8 \times 10^{-4}$ cal. per sec. per square cm. per degree centigrade per cm. The quantity ($\lambda$) may be defined as the quantity of heat in gram calories transmitted per second through a plate of a material one centimeter thick and one square centimeter in area when the temperature difference between the two sides of the material is one degree centigrade. Normally, the layer 3 should conduct at least about 0.00005 calorie per second for each square centimeter of area when the difference between the two surfaces is one degree centigrade.

The heat conductivity value of the metal layer 9 should preferably be at least as large as that of aluminum which is about 0.5 cal. per second per square centimeter per degree centigrade per centimeter at 18° C. and the metal layer 9 should generally conduct at least about 0.00025 cal. per second for each square centimeter in area when the difference in temperature is one degree centigrade. The aluminum foil should have a thickness of about .0002 inch to .003 or .004 inch and preferably has a thickness of about .0005 to .0015 inch when the Mylar layer is about 0.0002 to 0.002 inch thick and the polyvinyl chloride layer is about .005 to .025 inch thick.

In a laminated sheet of the type shown herein the Mylar layer 5 preferably has a thickness of about 0.0002 to 0.002 inch and the polyvinyl chloride layer 3 preferably has a thickness of about 0.01 to 0.025 inch.

As shown in the drawings, the thickness of the Mylar layer 5 is about .0005 inch, the thickness of the polyvinyl chloride layer 3 is about 0.014 inch, and the thickness of the aluminum layer 9 is about 0.001 inch.

A fibrous backing material is preferably used so the metal layer may be adhered to a base. Fibrous material such as felted cellulose or wood fiber treated with a rubber or resin latex and pressed together to form a chipboard-like base of substantial strength is preferred. However, rubber-impregnated paper or textile fabrics may be used as a backing material. As herein shown, a paper layer 13 is bonded to the aluminum layer 9. The paper layer preferably has a thickness of about 0.005 to 0.03 inch and usually is about 0.012 inch.

An adhesive film 14 is provided to bond the paper layer to the aluminum layer. Various cements may be used to form this film, those cements which are water resistant being preferred. In the laminated sheet shown herein, the cement forming the film may be a polyvinyl acetate emulsion or a tackified neoprene-latex or natural-rubber-latex with casein as an extender, best results (including most water resistance) being obtained with a neoprene-latex cement. This cement may be used as a wet laminating adhesive and may be applied to a sheet of aluminum foil by the reverse roller coating method. The coated aluminum foil may then be calendered to the paper layer and dried in an oven and afterward may conveniently be wound up for storage or further processing.

The neoprene-latex adhesive is an alkaline dispersion of polymerized chloroprene (2-chloro-1,3-butadiene) containing dispersing and stabilizing agents. This neoprene latex would usually be compounded with various metallic oxides, antioxidants, fillers, thickeners, tackifiers and plasticizers of the type used in latex compounding to obtain the desired properties.

The fibrous layer 13 of the laminated plastic sheeting may be applied to a table top, counter top or other base made of a material such as wood, metal or the like so as to provide an excellent burn- and stain-resistant covering. Various cements may be employed to bond the fibrous layer 13 to a base. The cement used to bond the heat-resistant article to the base is preferably waterproof although for some applications at least a part of the cementing material may be of a non waterproof type such as a lignin-type glue. As herein shown, the paper layer 13 is bonded to a wooden base 15 by means of a cement film 16. The film 16 may, for example, be a neoprene-type contact cement consisting of polychloroprene elastomers, tackifying resins, small amounts of fillers, stabilizers, and aromatic solvents such as toluol with a small percentage of an ester such as ethyl acetate.

A preferred neoprene-type contact cement is a composition D comprising a polychloroprene mixture of about 60% by weight of a "Neoprene Type CG" polychloroprene and 40% by weight of "Neoprene Type E" polychloroprene and about 30 percent of a tackifying resin such as a coumarone-indene based on the weight of the elastomers.

The cement D may be applied to the base 15 or to the paper layer 13 or both by brushing or other suitable means and thereafter associating the base and paper layer together to provide a strong bond thereto.

The following examples illustrate our invention:

*Example I*

A sheet of polyvinyl chloride base compound of the following composition is prepared and printed on one side with a desired design:

| | Parts |
|---|---|
| Vinyl resin (polyvinyl chloride) | 100 |
| Plasticizer (diethylene-glycol sebacate or other viscous polyester) | 50 |
| Stabilizers: | |
| Tin laurate | 2 |
| Phenyl-beta-naphthylamine | 1 |
| Pigments | 5 |
| Filler (calcium carbonate) | 16 |

The printed side of the 0.012 inch thick sheet is covered with a thin hard transparent layer of Mylar. The Mylar layer is 0.001 inch thick and is bonded to the polyvinyl chloride with a transparent adhesive composition A identical to that shown in Table I.

Another two-ply laminate is formed by bonding a layer of aluminum foil having a thickness of 0.001 inch to a paper sheet with a thickness of .012 inch by means of an adhesive B comprising a tackified natural rubber latex with casein as an extender.

The Mylar-polyvinyl chloride laminate is then bonded to the two-ply laminate of aluminum and paper by means of a coating applied from solution of an adhesive composition C having a resinous ingredient formed from the reaction of vinyl alcohol and butyraldehyde. The resulting 4-ply laminate is then adhered to a one-inch thick wooden base with neoprene-type contact cement D containing polychloroprene elastomers and a coumarone-indene tackifying resin as described above.

A lighted cigarette was placed on the surface of the laminated sheet but there was no evidence of burning or scorching indicating that heat was conducted away from the surface at a rapid rate by the sheet.

*Example II*

The composition of the polyvinyl chloride layer of Example I was replaced by the following composition:

| | Parts |
|---|---|
| Vinyl resin (polyvinyl chloride) | 90 |
| Resinous copolymer of vinyl chloride and vinyl acetate [1] | 10 |
| Polymeric plasticizer [2] | 30 |
| Monomeric plasticizer [3] | 20 |
| Stabilizer (cadmium-barium laurate) | 2 |
| Filler (calcium carbonate) | 50 |

[1] The copolymer preferably has a low molecular weight and may be a copolymer of 85 to 88% vinyl chloride and 12 to 15% vinyl acetate.
[2] The polymeric plasticizer is poly-propyleneglycol sebacate but may also include diethyleneglycol sebacate, polyethyleneglycol adipate or other non-migratory plasticizer such as Paraplex G-40, G-50 or G-60 or other high molecular weight polyester, or a complex fatty-acid ester such as Plastolein 9720.
[3] The monomeric plasticizer may be di-(2-ethyl hexyl) phthalate, dioctyl sebacate or dioctyl azelate and is preferably a high molecular weight phthalate.

A heat resistant laminated article was made in a similar manner to the article of Example I except that the composition of the polyvinyl chloride layer was different as above described.

Similar results were obtained by testing the heat dissipating means of the plastic article by placing a lighted cigarette on its surface. Again there was no evidence of burning or scorching.

*Example III*

A heat resistant laminated article was made in a similar manner to the article of Example I except that a polyvinyl chloride sheet having a thickness of 0.016 inch was substituted for the polyvinyl chloride sheet having a thickness of 0.012 inch. Also a layer of aluminum having a thickness of 0.0005 inch used in place of the 0.001 inch thick layer of aluminum foil of Example I, and a paper layer having a thickness of 0.016 inch was used in place of the 0.012 inch thick paper layer.

A lighted cigarette was placed on the Mylar surface of the laminated article and no evidence of burning or scorching was observed.

*Example IV*

A printed polyvinyl chloride sheet with a thickness of 0.012 inch is prepared as in Example I and is bonded to a thin hard transparent layer of Mylar having a thickness of 0.001 inch by the transparent adhesive composition A to form a first two-ply laminated sheet or laminate.

A second two-ply laminate is formed by bonding a layer of aluminum foil having a uniform thickness of 0.001 inch to a paper sheet having a thickness of 0.012 inch by means of a neoprene-casein-latex adhesive E having the following composition:

| | Parts |
|---|---|
| Chloroprene latex (33% solids) | 300 |
| Zinc oxide (25% aqueous dispersion) | 20 |
| Magnesium oxide (20% aqueous dispersion) | 20 |
| Phenyl-beta-naphthylamine (as slurry) | 2 |
| Casein (as 30% ammoniacal solution) | 30 |
| Ammonium rosinate (20% aqueous solution) | 50 |

The polyvinyl layer of the first laminate is then bonded to the aluminum layer of the second laminate by a coating applied from solution of a tripolymer resin adhesive F having a measured hydroxyl value of around 7% and having a chemical composition approximately as follows:

| | Percent |
|---|---|
| Polyvinyl butyral | 80.0 |
| Polyvinyl alcohol | 19.0 |
| Polyvinyl acetate | 0.3 |

The resulting 4-ply laminate is then adhered to a one-inch thick wooden base by means of a suitable cement such as the neoprene-type contact cement D described above.

The resulting laminated product is found to have exceptional durability and resistance to scorching by burning cigarettes or other hot articles.

*Example V*

A laminated article is formed in the same way as in Example IV except that the adhesive F is replaced by an adhesive G which is a tripolymer resin having a measured carboxyl value of around 0.7 to 0.8 percent and an approximate chemical composition as follows:

| | Percent |
|---|---|
| Polyvinyl chloride | 86 |
| Polyvinyl acetate | 13 |
| Dibasic acid (maleic acid) | 1 |

The adhesive G is formed by mixing 100 parts of this resin with 15 to 35 parts of a conventional plasticizer, such as tricresyl phosphate or di-(2-ethylhexyl) phthalate.

The laminated article is found to have durability and heat resistance at least equal to that of the article of Example IV, the adhesive layer G being superior to the layer F.

The term "parts" as used in the above examples means parts by weight. Likewise, wherever used in the specification or claims, percentages refer to percentages by weight.

It is to be understood that the particular products shown and described herein are presented for the purposes of explanation and illustration rather than by way of limitation and that various modifications of said product can be made without departing from our invention.

This application is a continuation-in-part of our co-pending application Serial No. 625,757, filed December 3, 1956, now abandoned, which corresponds to British specification No. 833,593.

What we claim is:

In a laminated heat and stain resistant sheet material suitable for counter tops and having a relatively thin transparent upper layer of polyethylene terephthalate, and a relatively thick intermediate layer of a polyvinyl chloride base compound bonded to said upper layer, the combination therewith of a cement layer consisting essentially of a tripolymer consisting of about 80 percent by weight of vinyl butyral groups, about 19 percent by weight of vinyl alcohol groups, and a small percentage of vinyl acetate groups, and a relatively thin lower layer of aluminum foil bonded to said intermediate layer by said cement.

References Cited in the file of this patent

UNITED STATES PATENTS

| 1,887,691 | Loetscher | Nov. 15, 1932 |
|---|---|---|
| 2,306,295 | Casto | Dec. 22, 1942 |
| 2,310,712 | Schmied | Feb. 9, 1943 |
| 2,403,077 | Hershberger | July 2, 1946 |
| 2,514,196 | Bradley | July 4, 1950 |
| 2,699,417 | Repsher et al. | Jan. 11, 1955 |
| 2,702,580 | Bateman | Feb. 22, 1955 |
| 2,765,251 | Williams | Oct. 2, 1956 |
| 2,804,416 | Phillipsen | Aug. 27, 1957 |
| 2,836,528 | Ford | May 27, 1958 |

OTHER REFERENCES

Publication—"Alloying With Epoxies," by J. Charlton; publ. in Modern Plastics, September 1954, pages 155–157.